Oct. 12, 1971  A. LIGHTBODY  3,611,553
METHOD OF FORMING TUBE JUNCTIONS
Filed May 26, 1969  2 Sheets-Sheet 1

United States Patent Office 3,611,553
Patented Oct. 12, 1971

3,611,553
METHOD OF FORMING TUBE JUNCTIONS
Alexander Lightbody, Kilbarchan, Scotland, assignor to Babcock & Wilcox Limited, London, England
Filed May 26, 1969, Ser. No. 827,721
Claims priority, application Great Britain, May 24, 1968, 24,997/68
Int. Cl. B23p *13/04*
U.S. Cl. 29—558
7 Claims

ABSTRACT OF THE DISCLOSURE

A tube junction having a root limb from which extend a plurality of branched limbs, one of which called a first branch limb is in coaxial relation with the root limb while the others are spaced around the axis of this first branch limb. All the branch limbs extend in the same direction and the terminating end portions thereof are in parallel closely pitched relationship with the axis of the first branch limb.

A method of making the aforesaid junction having the sequential steps of forging, boring, and bending into the desired shape.

---

This invention relates to tube junctions and a method of forming same. The invention more particularly concerns tube junctions incorporating a first branch limb and a further branch limb or a plurality of further branch limbs spaced around the axis of the first branch limb, the further branch limb or limbs extending in the same direction as the first branch limb and having outer portions whose axes are in parallel closely-pitched relationship with the axis of the first branch limb. It will be understood that by the term "closely pitched" is meant a closeness of pitch such that access of an orbital welding machine to the ends of both or all of the branch limbs would be precluded.

According to the invention, there is provided a method of forming a tube junction in which a solid blank is forged comprising three or more limbs having linear axes, the limbs are bored out, and at least one of the limbs is bent subsequent to the boring out of that limb.

According to the invention, there is also provided a method of connecting tube lengths to a tube junction as formed above, in which a tube length is welded to the or each further branch limb using an external orbital welding machine, a tube length is welded to the first branch limb using a bore welding arrangement extending through the bore in the root limb, and a tube length is welded to the root limb using an orbital welding machine.

According to the invention, there is further provided a tube junction as formed above.

For a better understanding of the invention, examples thereof will now be described with reference to the accompanying drawings, in which.

Figure 1:
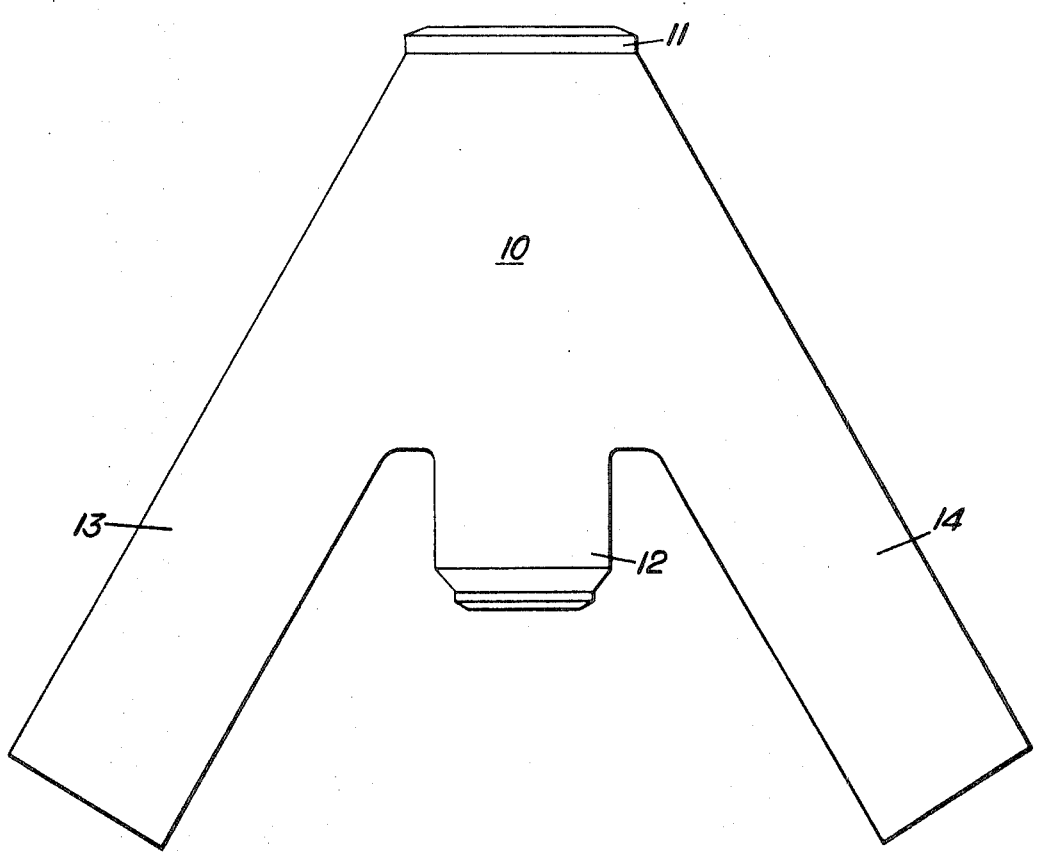
FIG. 1 is an elevation of a forged solid blank from which a tube trifurcation is to be formed.

Referring to FIG. 1, the forged solid blank 10 has four limbs with co-planar axes, consisting of a root limb 11, a first branch limb 12 co-axial therewith, and two further branch limbs 13 and 14, one at each side of, and at equal inclinations to, the first branch limb 12. The two further branch limbs 13 and 14 are each of a length greater than that of the first branch limb 12.

Figure 2:
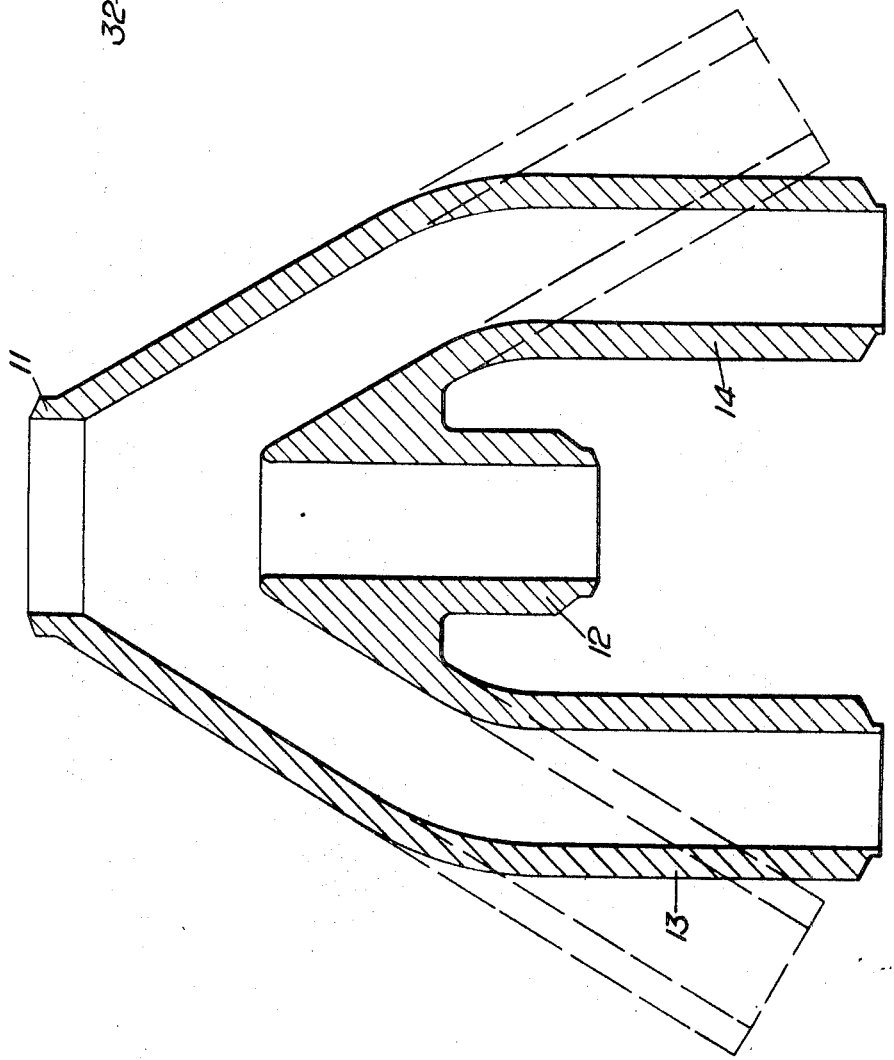
FIG. 2 is a sectional elevation of a tube trifurcation formed from the solid blank shown in FIG. 1.

Referring to FIG. 2, the further branch limbs 13 and 14 are then bored out to the required internal diameter and flexible mandrels (not shown) are inserted therein. The outer portions of the further branch limbs 13 and 14 are bent together toward the first branch limb 12 so as to extend parallel to each other (the outer portions being indicated by broken lines before bending and by continuous lines after bending) with their axes co-planar with, equidistant from, and in closely-pitched relationship with the extended axis of the first branch limb 12. The branch limbs 13 and 14 extend beyond the end faces of the first branch limb 12 thus allowing access for an orbital welding machine as described hereinafter. The flexible mandrels, which serve to limit pinching of the limbs during the bending operations are then removed and the first branch limb 12 is bored out followed by counter-boring out the root limb and machining welding groove faces on each limb.

To weld tube lengths to the trifurcation, the ends of the tube lengths are prepared with welding groove faces. Tube lengths are welded to the two further branch limbs 13 and 14 using an external orbital welding machine, there being sufficient clearance between the two limbs since they extend beyond the end face of the first branch limb 12. A third tube is then welded to the first branch limb 12 using a bore welding arrangement, gaining access through the bore in the root limb 11, and finally a tube length is welded to the root limb 11, using an orbital welding machine.

Figure 3:
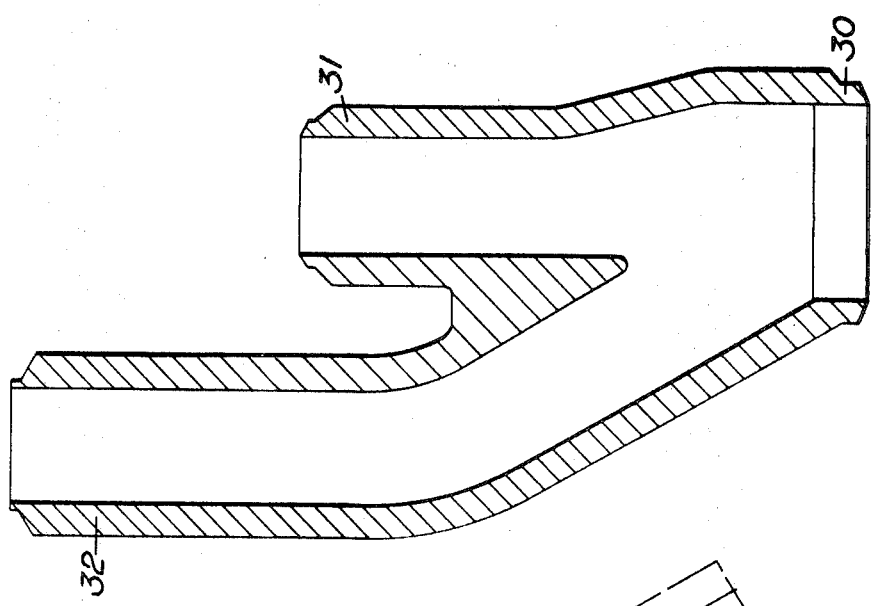
FIG. 3 is a sectional elevation of a tube bifurcation.

Referring to FIG. 3, the tube bifurcation has been formed from a forged solid blank resembling the blank for the trifurcation but with one of the further branch limbs omitted. The tube bifurcation has three limbs with co-planar axes, consisting of a root limb 30, a first limb 31 co-axial therewith, and a further branch limb 32 of a length greater than that of the first branch limb 31. The machining and bending operations are similar to those in the case of the trifurcation. Thus the further branch limb 32 is bored out to the required internal diameter and the outer portion thereof is bent, employing a flexible mandrel positioned therein, so as to extend parallel to the first branch limb 31 and with its axis in closely-pitched relationship with the extended axis of the first branch limb 31. The further branch limb 32 extends beyond the end face of the first branch limb 31 thus allowing access for an orbital welding machine as described hereinafter. The flexible mandrel is removed and the first branch limb 31 is bored out followed by counterboring out the root limb 30.

To weld tube lengths to the bifurcation, a tube length is welded to a further branch limb 32 using an orbital welding machine, access of the latter being permitted as the further branch limb 32 extends beyond the end face of the first branch limb 31. A second tube is then welded to the first branch limb 31 using a bore welding arrangement, gaining access through the bore in the root limb 30, and finally a tube length is welded to the root limb 30, using an orbital welding machine.

Alternatively, the root and branch limbs can be drilled out and the welding groove faces machined prior to the bending operation or operations but this procedure is liable to give rise to distortion.

I claim:

1. A method of forming a tube junction in which a solid blank is forged comprising three or more limbs having linear axes, the limbs are bored out, and at least one of the limbs is bent subsequent to the boring out of that limb.

2. A method of forming a tube junction according to claim 1, in which the solid blank includes a root limb, a first branch limb extending co-axially with the root limb on a central axis and a further branch limb having a length greater than that of the first branch limb, and in which the further branch limb is bored out and bent so that the outer portion thereof has an axis in parallel closely-pitched relationship with the central axis, the further branch limb extending beyond the end face of the first branch limb by an amount sufficient to permit access of an external orbital welding machine to the end of the further branch limb.

3. A method of forming a tube junction according to claim 2, in which the solid blank includes a plurality of said further branch limbs spaced around the central axis, each further limb having a length greater than that of the first branch limb, and in which the further branch limbs are bored out and bent so that the outer portions thereof extend in the same direction as the first branch limb and have axes in parallel closely-pitched relationship with the central axis, the further branch limbs extending beyond the end face of the first branch limb and being spaced from each other by an amount such that access of an external orbital welding machine to the ends of the further branch limbs is permitted.

4. A method of forming a tube junction according to claim 3, in which the solid blank is in the form of a trifurcation comprising said root limb, said first branch limb, and two said further branch limbs, one at each side of the first branch limb and having their axes co-planar with the axis of the first branch limb.

5. The method of forming a tube junction of claim 2 wherein a flexible mandrel is positioned in each bored-out subsequent to bending a further branch limb.

6. The method of forming a tube junction of claim 2 wherein a flexible mandrel is positioned in each bored-out further branch limb during the bending thereof.

7. The method of forming a tube junction of claim 2 wherein welding groove faces are machined on the end faces of each of the limbs subsequent to said bending operation.

References Cited

UNITED STATES PATENTS

| | | | |
|---|---|---|---|
| 765,484 | 7/1964 | Hochstein | 285—155 X |
| 810,047 | 1/1906 | Fruin | 285—155 X |
| 1,860,605 | 5/1932 | Boldwin, Jr. | |
| 2,312,659 | 3/1943 | Luff | 285—155 X |
| 2,608,390 | 8/1952 | Huet | 285—150 X |
| 2,749,148 | 6/1956 | Schneiderman | 285—155 X |
| 2,762,635 | 9/1956 | Lorber | 285—155 |
| 3,083,454 | 4/1963 | Heppenstoll, Jr. | 29—557 X |
| 3,417,450 | 12/1968 | Zell | 29—558 X |
| 3,503,123 | 3/1970 | Law | 29—558 |

JOHN F. CAMPBELL, Primary Examiner

R. J. SHORE, Assistant Examiner

U.S. Cl. X.R.

285—150